United States Patent
Takeuchi et al.

(10) Patent No.: US 6,947,729 B2
(45) Date of Patent: Sep. 20, 2005

(54) MOBILE COMMUNICATION TERMINAL AND METHOD HAVING CALCULATED TERMINAL POSITION UNCERTAINTY CHECK FUNCTION

(75) Inventors: Toshihiro Takeuchi, Tokoname (JP); Michio Shamoto, Niwa-gun (JP); Hiroyasu Ogino, Okazaki (JP); Kyoji Oda, Gamagori (JP); Tatsuya Shintai, Chita-gun (JP); Atsushi Hayashida, Kariya (JP)

(73) Assignee: Denso Corporation, Kariya (JP)

( * ) Notice: Subject to any disclaimer, the term of this patent is extended or adjusted under 35 U.S.C. 154(b) by 408 days.

(21) Appl. No.: 10/235,937

(22) Filed: Sep. 6, 2002

(65) Prior Publication Data

US 2003/0050077 A1 Mar. 13, 2003

(30) Foreign Application Priority Data

Sep. 7, 2001 (JP) .................................... 2001-272190

(51) Int. Cl.[7] .............................................. H04Q 7/20
(52) U.S. Cl. ............................ 455/414.2; 455/404.2; 455/456.3; 701/213
(58) Field of Search ...................... 455/456.1, 456.3, 455/456.6, 457, 414.4, 414.2, 404.2; 701/213

(56) References Cited

U.S. PATENT DOCUMENTS

| | | | | |
|---|---|---|---|---|
| 4,806,940 A | * | 2/1989 | Harral et al. ................ 342/451 |
| 5,490,076 A | * | 2/1996 | Rawicz et al. ................ 455/98 |
| 5,504,492 A | * | 4/1996 | Class et al. ............ 342/357.06 |
| 6,198,914 B1 | * | 3/2001 | Saegusa .................... 455/404.2 |
| 6,266,534 B1 | * | 7/2001 | Raith et al. ............... 455/456.3 |
| 6,662,013 B2 | * | 12/2003 | Takiguchi et al. ........ 455/456.2 |
| 2003/0050079 A1 | * | 3/2003 | Tsunehara et al. ........... 455/456 |
| 2003/0146871 A1 | * | 8/2003 | Karr et al. ................... 342/457 |
| 2003/0191696 A1 | * | 10/2003 | Yamamoto et al. ........... 705/26 |

FOREIGN PATENT DOCUMENTS

| JP | A 4-95888 | 3/1992 |
|---|---|---|
| JP | A 10-213644 | 8/1998 |

* cited by examiner

*Primary Examiner*—W. R. Young
*Assistant Examiner*—Dai Phuong
(74) *Attorney, Agent, or Firm*—Oliff & Berridge, PLC

(57) ABSTRACT

A mobile communication terminal stores positioning information including global positioning system signals and base station information required by a position server in a communication network to calculate the terminal position. When the position server calculates the terminal position based on these positioning unit information, the position information is not reported to the user if the indefinite information equivalent to a positioning error contained in the average value calculated for the terminal position information exceeds a predetermined threshold value. When the average processing count exceeds a maximum positioning count, that average value is reported to the user.

11 Claims, 3 Drawing Sheets

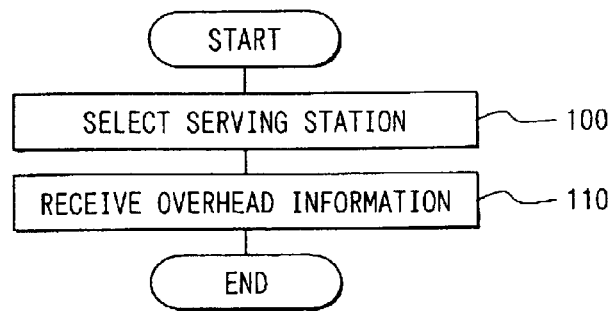
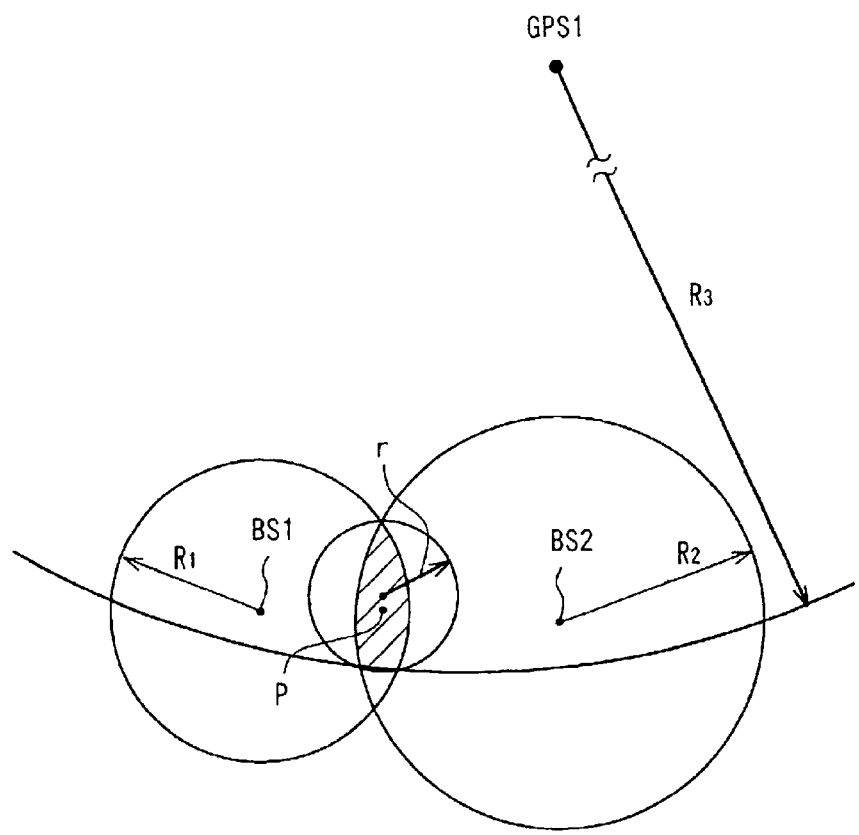

MOBILE COMMUNICATION TERMINAL AND METHOD HAVING CALCULATED TERMINAL POSITION UNCERTAINTY CHECK FUNCTION

CROSS REFERENCE TO RELATED APPLICATION

This application is based on and incorporates herein by reference Japanese Patent Application No. 2001-272190 filed on Sep. 7, 2001.

FIELD OF THE INVENTION

The present invention relates to a mobile communication terminal device such as cellular telephones and mobile communication terminals for performing wireless communication with base stations, and in particular ideal for finding the position of the mobile communication terminal device.

BACKGROUND OF THE INVENTION

In the presently proposed system, communication networks such as cellular telephone networks send information measured by the mobile communication terminal to a position server within the communication network, and the mobile communication terminal can acquire position information on the mobile communication terminal calculated by the position server. In other words, the mobile communication terminal measures the amount of signal delay between the signal from the base station synchronized with the GPS (Global Positioning System) versus the GPS signal from the GPS satellite, and reports that information to the position server. The position server calculates the terminal position based on information reported from the terminal, reports the calculated results to the terminal, and informs the terminal user.

However, the mobile terminal receiving conditions did not always allow positioning information (base station information such as GPS signals and amount of signal delay) needed for calculation, to be measured and collected with good accuracy.

SUMMARY OF THE INVENTION

In view of the above problems, the present invention has the object of providing a mobile terminal device that changes the method for reporting position information to a terminal user according to the terminal position information calculation accuracy. Specifically, position information is not reported to the user when calculation accuracy is low in other words, exceeds a tolerance range, and highly accurate position information is provided to the user by continuing to acquire calculated position information until calculation accuracy falls within the tolerance range.

According to the present invention, a mobile communication terminal collects and sends at least positioning information containing base station information for terminal position calculation, and receives terminal position information calculated by a position server. The mobile communication terminal compares uncertain information equivalent to a position calculation error contained in the terminal position information with a predetermined threshold, and outputs the acquired terminal position information to a user only when the uncertainty information is less than the predetermined threshold. The mobile communication terminal repeats collecting and sending the positioning information without outputting the acquired terminal position when the uncertain information is more than the predetermined threshold. The mobile terminal stores the terminal position information when the uncertain information is more than the predetermined threshold, and calculates and outputs an average value of the stored terminal position information.

BRIEF DESCRIPTION OF THE DRAWINGS

The above and other objects, features and advantages of the present invention will become more apparent from the following detailed description made with reference to the accompanying drawings. In the drawings:

FIG. 3 is a flowchart showing the information processing in the idle state in the mobile communication terminal of the embodiment;

FIG. 5 is an explanatory diagram showing the terminal position and overall principle of the uncertainty calculation method.

DETAILED DESCRIPTION OF THE PREFERRED EMBODIMENT

Figure 1:
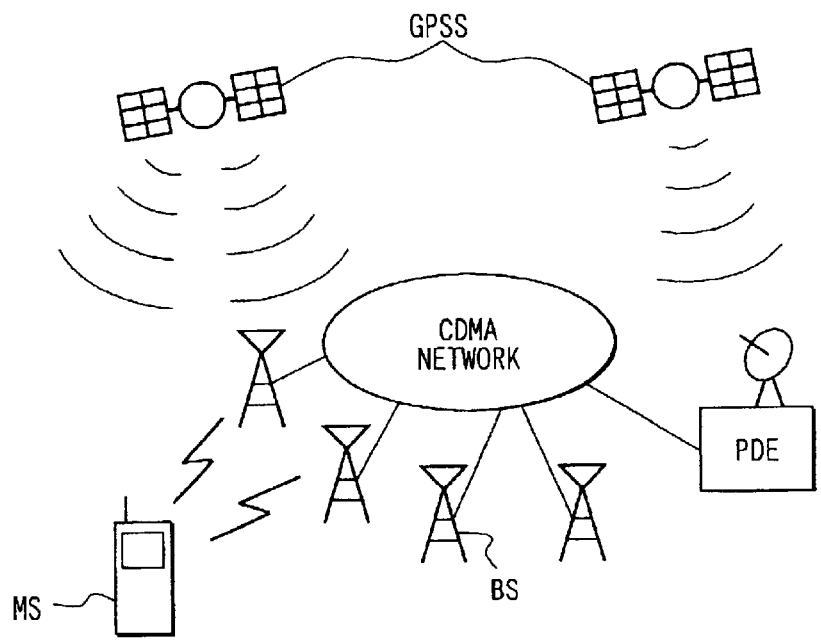
FIG. 1 is a schematic view showing a communication system of an embodiment of the present invention.

The overall system for the CDMA (Code Division Multiple Access) communication network used by a mobile communication terminal of an embodiment of the invention is shown in FIG. 1. The mobile terminal MS communicates with base stations BS linked to the CDMA network. A dedicated position server PDE is also connected to the CDMA network to make the actual positioning calculation based on information acquired from the mobile terminal MS that is needed for calculating the terminal position. The base stations BS and position servers PDE receive signals from GPS satellites GPSS. Their system clocks are synchronized with the GPS signal. The mobile terminal MS is capable of receiving GPS signals and send these received GPS signals as the positioning information needed for calculating the terminal position, to the position server PDE via the network.

Figure 2:
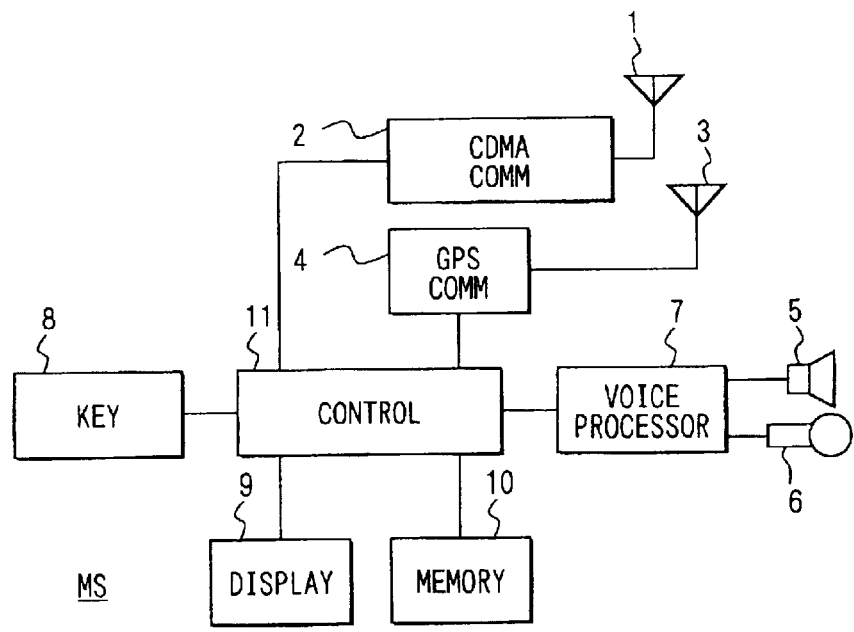
FIG. 2 is a block diagram showing the structure of a mobile communication terminal of the embodiment.

The mobile communication terminal MS includes, as shown in FIG. 2, a CDMA antenna 1 for communicating with the base stations BS, a CDMA communication section 2 for sending and receiving communications, a GPS antenna 3 and GPS communication section 4 as the GPS receiver for receiving signals from the GPS satellite. It also includes a speaker 5 for voice interface with a terminal user, a microphone 6 and a voice processor 7, a key panel 8 for entering user operating instructions, a display 9 for showing information to the terminal user, a memory 10 to store programs and data, and a control section 11 to run programs and control each section. This mobile communication terminal MS may be configured by a computer. The key panel 8 may also be a touch panel for joint use with the display 9. Also, one antenna may be jointly used as the CDMA antenna 1 and the GPS antenna 3.

The method for calculating the terminal position by using the position server PDE is described here. In the following explanation, the PN (Pseudo Noise) code is a spread code for the CDMA method. A maximum of 512 types of codes are assigned to each base station BS. The terminal MS that has synchronized with the base station BS, identifies the base station by means of the time (phase difference) from the start point of the first period of the PN code string during reverse spread by receive signal PN code, up to generation of the correlation peak. The amount of signal delay is the delay in the signal caused by the signal propagation time between the base station BS and the terminal for the PN code phase differential.

The position of the terminal MS using the position server (PDE) is generally calculated as follows. Based on GPS signals (satellite No. and receive times), signal delays and PN codes for the reference base station and other peripheral base stations collected by the terminal MS, the longitude and latitude of each base station is acquired from a database corresponding to the PN codes. The distance between each base station BS and the terminal MS is calculated from the signal delay of other peripheral base stations, using the reference base station with the smallest signal delay (in other words, estimated as nearest to the terminal MS) as the time standard. The distance between the GPS satellite and terminal MS is also calculated from the GPS satellite No. and the receive time. Using these values, the position of the terminal MS can then be specified according to the principle of triangulation.

However, precisely determining the terminal position by calculating the distance from the base station BS and GPS satellite position coordinates as shown in FIG. 5, is usually difficult. The overall principle of the method for detecting the terminal position P is explained simply in FIG. 5, by using the distances R1, R2, R3 as positions from the two base stations BS1, BS2 and the zone GPS satellite GPS 1 (already stored in position server PDE), respectively. The respective distances are determined by the radio wave propagation time. However the actual distance will vary due to radio wave reflection from buildings, changes in propagation path conditions, clock errors and errors in satellite trajectory, etc.

Even if one attempts to determine the terminal position P by the point where three circles comprising these distances overlap, an indeterminate area constituted by an estimated error range shown by the shaded (hatched) section in FIG. 5 will occur. Here, for example, the center coordinate of the shaded section constituting this indeterminate area can be substituted as the terminal position, and the radius r of the circumscribed circle (actually a circumscribed sphere since the indeterminate area is three-dimensional) of the shaded section, can be used as an indicator for rating the terminal position indeterminacy (uncertainty). The uncertainty r may be made the distance to the point farthest from the center coordinates of the shaded section. Also, the center coordinate of the circumscribed circle (sphere) may be substituted for the calculated terminal position.

Figure 4:
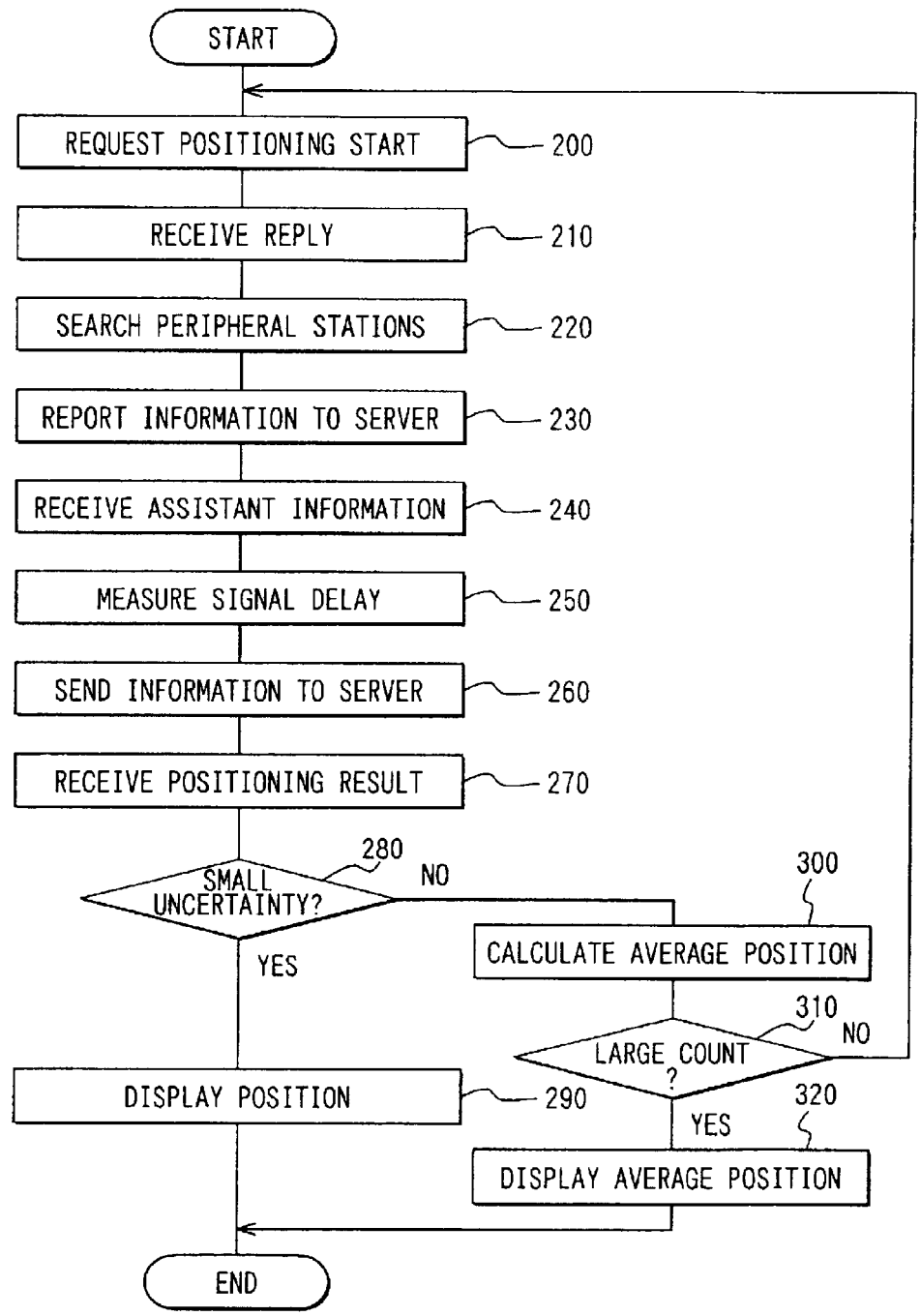
FIG. 4 is a flowchart showing positioning information collection and position terminal acquisition-display processing in the mobile communication terminal of the embodiment.

Processing run by the computer of the mobile terminal MS is next described while referring to FIG. 3 and FIG. 4.

In the idle state (standby state) right after the terminal MS is turned on and no communications are in progress, the terminal MS searches, as shown in FIG. 3, the peripheral base stations BS based on the neighbor list described later on, and selects a base station with satisfactory receive signals from that neighbor list as the serving base station (step 100). Overhead information is received from the paging channel of that serving base station (step 110). The overhead information contains serving base station PN codes and identification signals, position information of the serving base station (latitude and longitude), usable frequencies, a neighbor list of peripheral base stations, and a network ID (identifier), etc. The terminal MS acquires this overhead information intermittently rewrites the contents by repeating the steps 100 and 110 in the idle state.

When there are no peripheral base stations in the pre-existing neighbor list such as when the terminal power is turned on after moving a long distance, the PN codes are sequentially searched and the base station added as the first serving base station is acquired as overhead information. In the idle state from then onwards, the acquired information is rewritten according to the flowchart in FIG. 3.

The process for collecting positioning information for making the calculation and acquisition of terminal position information is next explained based on FIG. 4. When start of measurement of position (positioning) is triggered by the user operating the keys to locate his own position, the terminal MS outputs a positioning start request to the communication network (step 200).

When a positioning reply is received (step 210) from the position server PDE in response to the positioning start request, the terminal MS searches peripheral base stations by utilizing the neighbor list, and along with selecting a base station PN code having a minimum signal delay as the reference base station, according to results received from radio waves of each base station (step 220). It also temporarily stores the PN codes and signal delays of the reference base station and each peripheral base station in the memory 10.

Here, a minimum signal delay is used to determine the reference base station because the position of that base station is estimated to be nearest the terminal MS.

Next in step 230, the (user's) terminal information and the above acquired peripheral base station information are reported to the position server PDE. The position server PDE sets a broad terminal position based on the information sent from the terminal MS, and according to that position sends back the GPS satellite No. and its supplemental parameters as positioning assistant information to the terminal MS. The terminal MS receives this positioning assistant information (step 240).

Based on the assistant information, the terminal MS receives the GPS signal from the GPS satellite and along with storing signals with a receive intensity larger than the threshold value, once again measures the amount of signal delay from the peripheral base station for the latest information (step 250). In this way, positioning information made up of GPS signals and base station information comprised of PN codes and signal delay amounts is collected.

In step 260, the collected positioning information is sent to the position server PDE. The position server PDE calculates the terminal position as previously described, based on the positioning information sent from the terminal MS, and sends back undefined (uncertainty) information along with the positioning results, to the terminal MS. The terminal MS receives the positioning result calculated by the position server PDE (step 270).

In step 280, a check is made as to whether or not the uncertainty information is within or exceeds a pre-established threshold value. If the uncertainty information is within the threshold value, that is, uncertainty is small, then the calculated values are sent unchanged, as highly accurate terminal position information to a display 9 for displaying the longitude/latitude of the mobile terminal MS, addresses or maps, and average data values for terminal position information described later on are discarded (step 290). This threshold value can be set beforehand for example to 100 meters, according to the position accuracy required by the user.

When determined in step 280 that the uncertainty threshold has been exceeded, the terminal position information is stored in the memory 10 and an average value of the stored position information is calculated in step 300. Here, the stored terminal position information is information determined as having low processing accuracy and stored up until then.

In step 310, a check is made if the count (number) of the stored terminal position information used for the average position calculation is higher or not than the maximum positioning count which is a pre-established specified count. If determined that the count is larger than the maximum positioning count, then the average value for the position information calculated in step 300 is shown on display 9 as the terminal position (step 320). This maximum positioning count can be set for example, from 5 through 10 depending on the position accuracy that the terminal user needs. The process executed in step 300 for calculating the average value for terminal position information can also be executed prior to step 320, if the storing count in step 310 exceeded the maximum positioning count.

When determined in step 310 that the storing count did not exceed the maximum positioning count, the process returns to step 200, a positioning start request is once again output to the position server PDE, positioning information collected and the terminal position information acquired from the position server. In this case, the process need not return to step 200, and the positioning information for the same peripheral base station and GPS satellite may be measured in step 250.

The program of the embodiment of the present invention stored in the memory 10 can be run by a control section 11. The program can also be distributed by way of a communication network, and the terminal MS can receive the program and store it in the memory 10 for use as needed.

The mobile communication terminal informs the terminal user of the position information calculated by the position server only when the uncertainty is small, that is, only when the calculated error in the terminal position is small. However when the uncertainty is large, that is, when the terminal position calculation error is large, then without informing the user as calculated, calculated position values are stored at the terminal until a maximum positioning count is reached and an average value found. After the maximum positioning count is reached, that average value is reported to the user as position information so that the terminal user can constantly be provided with highly accurate position information.

What is claimed is:

1. A mobile communication terminal for communicating with base stations forming a communication network comprising:

means for collecting at least positioning information containing base station information of the base stations;

means for sending the positioning information on the communication network as information required for calculating a terminal position;

means for acquiring terminal position information calculated for the communication network based on the positioning information;

means for checking whether uncertain information equivalent to a position calculation error contained in the terminal position information is within a predetermined threshold; and means for controlling an output of the terminal position information to a terminal user, the controlling means enabling and disabling the output of the terminal position information when the uncertain information is less than and more than the predetermined threshold, respectively, and causing the collecting means and the sending means to collect and send the positioning information again to the communication network for positioning calculation when the uncertain information is more than the predetermined threshold.

2. A mobile communication terminal according to claim 1, the controlling means includes:

means for storing the terminal position information when the uncertain information is more than the predetermined threshold; and calculating an average of the stored terminal position information so that the calculated average is output.

3. A mobile communication terminal according to claim 1, further comprising:

means for receiving a GPS signal from a GPS satellite, wherein the sending means sends the GPS signal as a part of the positioning information required for calculating the terminal position.

4. A mobile communication terminal according to claim 1, wherein the sending means sends the positioning information to a position calculating server through the communication network so that the terminal position is calculate by the position calculation server, and the acquiring means acquires the terminal position information through the communication network.

5. A mobile communication terminal according to claim 1, wherein the uncertain information is calculated as a radius of a circle which circumscribes an area of overlap of a plurality of circles, assuming that the mobile communication terminal is within the area.

6. A mobile communication terminal according to claim 1, wherein the uncertain information is calculated as a distance largest from a center coordinate of an area of overlap of a plurality of circles.

7. A computer readable medium having a computer program including instructions for communicating with base stations forming a communication network, wherein the program comprises steps of:

collecting at least positioning information containing base station information on the base stations, as information required for calculating the terminal position;

sending the positioning information to the communication network for positioning calculation;

acquiring terminal position information calculated on the communication network;

comparing uncertainty information equivalent to a position calculation error contained in the terminal position information with a predetermined threshold;

outputting the acquired terminal position information to a user only when the uncertainty information is less than the predetermined threshold; and collecting and sending the positioning information to the communication network for positioning calculation, without outputting the acquired terminal position to the terminal user when the uncertain information is more than the predetermined threshold.

8. A computer readable medium having a computer program, according to claim 7, the program further comprising a step of:

storing the terminal position information which includes the uncertain information in more than the predetermined threshold;

counting the number of times of storing the acquired terminal position information; and outputting to the terminal user an average value of the stored terminal position information, when the number of the stored position information reaches a predetermined reference.

9. A computer readable medium having a computer program, according to claim 7, the program further comprising a step of:

acquiring a GPS signal from a GPS satellite, wherein the sending step sends the acquired GPS signal with the positioning information required for calculating the terminal position.

10. A method of determining a mobile terminal position comprising steps of:

receiving a positioning calculation request input to a mobile terminal;

selecting a PN code of a base station as a reference station from a plurality of neighbor base stations provided away from the mobile terminal by searching the neighbor base stations based on a neighbor list, the reference station being defined to be one that has a minimum signal delay;

sending PN codes and signal delays of the neighbor base stations to a position server provided away from the mobile terminal after storing the PN codes and the signal delays;

receiving assist information from the position server;

acquiring a GPS signal of a GPS satellite and neighbor base station information based on the assist information;

sending the GPS signal and the neighbor base station information to the position server so that a mobile terminal position is calculated by the position server;

receiving mobile terminal position information with uncertain information from the position server;

checking whether the uncertain information is more than or less than a predetermined threshold;

indicating the mobile terminal position information when the uncertain information is less than the predetermined threshold; and repeating all of the above steps when the uncertain information is more than the predetermined threshold.

11. A method according to claim 10 further comprising steps of:

counting the number of repetition of the repeating step; and calculating and indicating an average of the mobile terminal position information when the number of repetition reaches a predetermined reference.

* * * * *